(12) United States Patent
Cai et al.

(10) Patent No.: US 11,106,935 B2
(45) Date of Patent: Aug. 31, 2021

(54) POOLING METHOD AND DEVICE, POOLING SYSTEM, COMPUTER-READABLE STORAGE MEDIUM

(71) Applicant: ThinkForce Electronic Technology Co., Ltd, Shanghai (CN)

(72) Inventors: Jinchi Cai, Shanghai (CN); Xiaopeng Li, Shanghai (CN); Liang Chen, Shanghai (CN)

(73) Assignee: THINKFORCE ELECTRONIC TECHNOLOGY CO., LTD, Shanghai (CN)

( * ) Notice: Subject to any disclaimer, the term of this patent is extended or adjusted under 35 U.S.C. 154(b) by 133 days.

(21) Appl. No.: 16/362,290

(22) Filed: Mar. 22, 2019

(65) Prior Publication Data

US 2019/0303705 A1 Oct. 3, 2019

(30) Foreign Application Priority Data

Mar. 29, 2018 (CN) .......................... 201810272843.5

(51) Int. Cl.
*G06K 9/46* (2006.01)
*G06K 9/00* (2006.01)

(52) U.S. Cl.
CPC ....... *G06K 9/4642* (2013.01); *G06K 9/00973* (2013.01)

(58) Field of Classification Search
CPC ............. G06K 9/4642; G06K 9/00973; G06K 9/6267; G06K 9/6232; G06T 1/20
USPC ....................................................... 382/282
See application file for complete search history.

(56) References Cited

U.S. PATENT DOCUMENTS

| | | | |
|---|---|---|---|
| 2018/0131946 A1* | 5/2018 | Lee .................... | G06K 9/6256 |
| 2018/0161946 A1* | 6/2018 | Marburger ............ | B23Q 3/005 |
| 2018/0232629 A1* | 8/2018 | Du ....................... | G06N 3/0454 |
| 2018/0315155 A1* | 11/2018 | Park .................... | G06F 17/153 |
| 2019/0179635 A1* | 6/2019 | Jiao ..................... | G06F 17/153 |

* cited by examiner

*Primary Examiner* — Jerome Grant, II
(74) *Attorney, Agent, or Firm* — Anova Law Group, PLLC

(57) ABSTRACT

Described herein is a pooling method and device, pooling system, computer-readable storage. The pooling method comprises: acquiring pixel data of each column in a pooling window column by column, each time after the pooling window is moved; performing a pooling operation on all of the pooling data in the pooling window when the last column of pixel data in the pooling window is acquired; and outputting a pooling result of the pooling operation. The technical solution of the invention may improve the pooling efficiency and the system performance.

13 Claims, 3 Drawing Sheets

POOLING METHOD AND DEVICE, POOLING SYSTEM, COMPUTER-READABLE STORAGE MEDIUM

TECHNICAL FIELD

This invention relates generally to the field of image processing. More particularly, the invention relates to a pooling method and device, pooling system, computer-readable storage medium.

BACKGROUND

In image processing, a pooling operation is usually performed, in order to reduce the data volume to be processed or stored. For example, after the features are obtained by convolution, the next step is to use these features for classification. However, this operation faces the challenge of large amount of computation. Therefore, in order to describe a larger image, aggregation statistics, that is, pooling, may be performed on features at different locations.

The pooling scheme common used in neural network is a software-based scheme. The pooling computing involves three parts: input data, pooling operations, and output results. Specifically, the central processing unit (CPU) or the convolution hardware accelerator saves the two-dimensional image data structure to be pooled on the main memory; the two-dimensional array of the data structure is denoted as img[height][width], wherein height is the height of the two-dimensional array and width is the width of the two-dimensional array. The CPU, when performing the pooling operation, requires to fetch the pixel data from the memory row by row.

However, in the prior art, it is required to occupy a large amount of CPU time to prepare the pooling data, read the pooling data and write the pooling result by the master CPU. Furthermore, when the CPU fetches pixel data row by row, the pooling data fetched may be not in a same pooling window, which may further lengthen the waiting time of the CPU, so that the time allocated by the CPU to other tasks may be less, causing the completion time of other tasks to be delayed, and the overall performance of the system may decline. In addition, in the current mainstream processor architecture, if a Cache Miss or Cache Flush operation is encountered, the CPU needs a large amount of waiting time when performing the pooling operation, thereby reducing the pooling efficiency.

BRIEF SUMMARY

The technical problem solved by the invention is to improve the pooling efficiency and the system performance.

In order to solve the aforementioned technical problem, an embodiment of the present invention provides a pooling method, comprising: acquiring pixel data of each column in a pooling window column by column, each time after the pooling window is moved; performing a pooling operation on all of the pixel data in the pooling window when the last column of pixel data in the pooling window is acquired; and outputting a pooling result of the pooling operation.

Optionally, the size of the pooling window is N×N, N is a positive integer, and the moving stride of the pooling window is equal to N, and acquiring pixel data of each column in a pooling window column by column comprises: receiving the pixel data of each column in the pooling window from outside, with the pixel data of each column being sent out column by column; or reading the pixel data of each column in the pooling window from the outside column by column.

Optionally, the size of the pooling window is N×N, N is a positive integer, and the moving stride of the pooling window is less than N, and acquiring pixel data of each column in a pooling window column by column comprises: reading the pixel data of each column in the pooling window from the outside column by column.

Optionally, the pixel data is a convolution operation result obtained after a convolution operation.

In order to solve the aforementioned technical problem, an embodiment of the present invention also provides a pooling device, comprising: an acquiring module, to acquire pixel data of each column in a pooling window column by column, each time after the pooling window is moved; a pooling operation module, to perform a pooling operation on all of the pixel data in the pooling window when the last column of pixel data in the pooling window is acquired; and an output module, to output a pooling result of the pooling operation.

Optionally, the size of the pooling window is N×N, N is a positive integer, and the moving stride of the pooling window is equal to N, and the acquiring module comprises: a pixel data receiving unit, to receive the pixel data of each column in the pooling window from outside, with the pixel data of each column being sent out column by column; a first pixel data reading unit, to read the pixel data of each column in the pooling window from the outside column by column.

Optionally, the size of the pooling window is N×N, N is a positive integer, and the moving stride of the pooling window is less than N, and the acquiring module comprises: a second pixel data reading unit, to read the pixel data of each column in the pooling window from the outside column by column.

Optionally, the pixel data is a convolution operation result obtained after a convolution operation.

In order to solve the aforementioned technical problem, an embodiment of the present invention further provides a pooling system, comprising: a pooling device; a pixel data output component, to provide the pixel data.

Optionally, the pixel data output component outputs pixel data of each row where the pooling window is located column by column.

Optionally, the pixel data output component outputs the pixel data of each column in the pooling window column by column in response to the reading request of the pooling device.

Optionally, the pixel data output component is a convolution operation accelerator or a central processor.

The embodiment of the invention further discloses a computer readable storage medium having computer instructions stored thereon, wherein the computer instructions when executed, perform the steps of the pooling method.

Compared with the prior art, the technical solution of the embodiment of the present invention has the following beneficial effects:

In the technical solution of the present invention, each time after the pooling window is moved, the pixel data of each column in the pooling window are acquired column by column: when the last column of pixel data in the pooling window are acquired, the pooling operation is performed on all of the pixel data in the pooling window; a pooling result of the pooling operation is output. In the technical solution of the present invention, when the pixel data need to be acquired, the pixel data in the pooling window are acquired column by column: avoiding the shortage in the prior art that the pixel data in the pooling window cannot be obtained until a period of time has lapsed when reading the pixel data row by row. Consequently, all the pixel data in the pooling window may be acquired more quickly, and the pooling operation can be performed more quickly, thereby improving the pooling efficiency. In addition, the acquired data are all pixel data in the pooling window with no additional pixel data (such as data outside the pooling window), therefore no memory or cache is required to temporarily store the pixel data, which is beneficial to the hardware implementation of the pooling device.

Further, the size of the pooling window is N×N, N is a positive integer, and the moving stride of the pooling window is equal to N, and acquiring the data of each column in the pooling window column by column comprises: receiving the pixel data of each column in the pooling window from outside, with the pixel data of each column being sent out column by column; or reading the pixel data of each column in the pooling window from the outside column by column. In the technical solution of the present invention, the stride of the pooling window is N, there is no overlap between adjacent pooling windows, and each pixel data are acquired only once; therefore, pixel data may be received or read from outside column by column, thereby realizing the diversity of pixel data acquisition, thus further improving the pooling efficiency.

Further, the size of the pooling window is N×N, N is a positive integer, and the moving stride of the pooling window is less than N, and acquiring the data of each column in the pooling window column by column comprises: reading the pixel data of each column in the pooling window from the outside column by column. In the technical solution of the present invention, the stride of the pooling window is less than N, there is overlap between adjacent pooling windows, the pixel data in overlapping portion are acquired twice; therefore, pixel data may be read from outside column by column to realize a repeated acquisition of pixel data; thereby, on the basis of improving the pooling efficiency, and taking into account the diversity of the pooling window, the scope of application of the pooling method is expanded.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description serve to explain the principles and operations of the claimed subject matter.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

As described in the background, in the prior art, it is required to occupy a large amount of CPU time to prepare the pooling data, read the pooling data and write the pooling result by the master CPU. Furthermore, when the CPU is fetching pixel data row by row, the pooling data fetched may be not in a same pooling window, which may further lengthen the waiting time of the CPU, so that the time allocated by the CPU to other tasks may be less, causing the completion time of other tasks to be delayed, and the overall performance of the system may decline. In addition, in the current mainstream processor architecture, if a Cache Miss or Cache Flush operation is encountered, the CPU needs a large amount of waiting time when performing the pooling operation, thereby reducing the pooling efficiency.

In the technical solution of the present invention, the pixel data in the pooling window will be acquired column by column after the window is moved, when the pixel data need to be acquired; avoiding the shortage in the prior art that the pixel data in the pooling window cannot be obtained until a period of time has lapsed when reading the pixel data row by row. Consequently, all the pixel data in the pooling window may be acquired more quickly, and the pooling operation can be performed more quickly, thereby improving the pooling efficiency. In addition, the acquired data are all pixel data in the pooling window with no additional pixel data outside the pooling window, therefore no memory or cache is required to temporarily store the pixel data, which is beneficial to the hardware implementation of the pooling device.

The specific embodiments of the present invention will be described in detail below in connection with the drawings, so as to make the above described objects, features, and advantages of the present invention more apparent.

Figure 1:
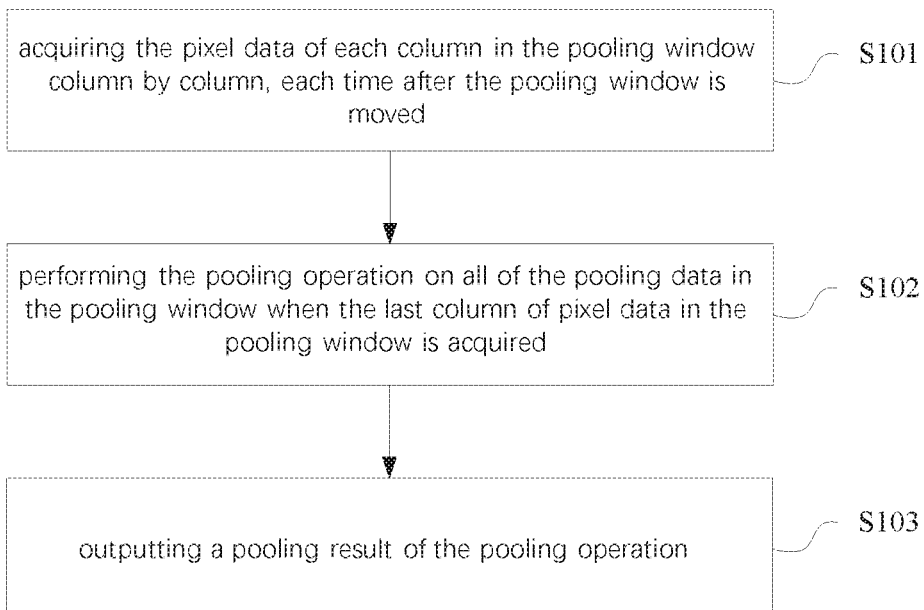
FIG. 1 is a flow diagram of a pooling method according to an embodiment of the present invention.

FIG. 1 is a flow diagram of a pooling method according to an embodiment of the present invention.

The pooling method shown in FIG. 1 may comprise the following steps:

Step S101: acquiring the pixel data of each column in the pooling window column by column, each time after the pooling window is moved;

Step S102: performing the pooling operation on all of the pixel data in the pooling window when the last column of pixel data in the pooling window is acquired;

Step S103: outputting a pooling result of the pooling operation.

The pooling operation described in this embodiment refers to: performing appropriate mathematical operations on all pixel data in the pooling window to obtain a pooling result, for example, calculating the average of all pixel data in the pooling window, or selecting the maximum value of all pixel data in the pooling window.

In this embodiment, the unit of the size of the pooling window is usually pixel data.

In the specific implementation of step S101, the acquired pixel data are data that need to be pooled. During the pooling operation, the pooling window needs to be moved to traverse all the pixel data to be pooled, that is, the image to be pooled. Specifically, moving the pooling window may refer to moving the pooling window laterally, or moving the pooling window vertically, such as moving laterally at first and then vertically.

For example, referring to FIG. 2, the size of the pooling window 20 is 2×2 and the image size to be pooled is 12×8; when the pooling window 20 is in the position of row 0 and row 1, column 0 and column 1, the data acquired column by column are sequentially as follows: pixel data (0,0), pixel data (1,0), pixel data (0,1) and pixel data (1,1), wherein the pixel data (1,0) represents the pixel data with a row number of 1 and a column number of 0. The order of obtaining pixel data is shown by the arrow in FIG. 2.

Similarly, after the pooling window 20 is moved laterally by two pixel data, when the pooling window 20 is in the position of row 0 and row1, column 2 and column 3, the data acquired column by column are sequentially as follows: pixel data (0,2), pixel data (1,2), pixel data (0,3) and pixel data (1,3), wherein the pixel data (0,2) represents pixel data with a row number of 0 and a column number of 2.

Other situations are similar to the above process and will not be repeated.

It should be noted that acquiring the pixel data of each column in the pooling window column by column refers to acquiring pixel data sequentially according to the order of the column numbers where the pooling window is located. For example, the column numbers where the pooling window is located are column 0, column 1, and column 2 in sequence, then the pixel data in the pooling window in the pixel data of the column 0 is acquired at first, and then the pixel data in the pooling window in the pixel data of the column 1 is acquired, finally the pixel data in the pooling window in the pixel data of the column 2 is acquired.

Continue to refer to FIG. 1, in the specific implementation of step S102, when the last column of pixel data in the pooling window is acquired, it means that all the pixel data in the pooling window have been completely acquired. At this point, the pooling operation may be performed on the pixel data in the pooling window.

Specifically, the pooling operation may be mean pooling, max pooling, or random pooling. Mean pooling refers to calculating the average of all data in the pooling window as the value of this pooling operation. Max pooling refers to selecting the maximum value of all data in the pooling window as the value of this pooling operation. Random pooling refers to selecting data from all data in the pooling window randomly according to the probability value thereof, and the probability value of the data is related to the size of the data.

Further, in the specific implementation of step S103, the pooling result of the pooling operation may be output. For example, the pooling result may be output to an appropriate memory for storage, or the pooling result may be output to a CPU or other component for further processing.

In an embodiment of the present invention, the pixel data in the pooling window will be acquired column by column after the window is moved, when the pixel data need to be acquired; avoiding the shortage in the prior art that the pixel data in the pooling window cannot be obtained until a period of time has lapsed when reading the pixel data row by row. Consequently, all the pixel data in the pooling window may be acquired more quickly, and the pooling operation can be performed more quickly, thereby improving the pooling efficiency. In addition, the acquired data are all pixel data in the pooling window with no additional pixel data outside the pooling window, therefore no memory or cache is required to temporarily store the pixel data, which is beneficial to the hardware implementation of the pooling device.

In one particular embodiment of the present invention, the size of the pooling window is N×N, N is a positive integer, and the moving stride of the pooling window is equal to N; step S101 shown in FIG. 1 may comprise the following steps: receiving the pixel data of each column in the pooling window from outside, with the pixel data of each column being sent out column by column, or reading the pixel data of each column in the pooling window from the outside column by column.

The stride of the pooling window is N, there is no overlap between adjacent pooling windows, and each pixel data are acquired only once.

In a specific implementation, the pixel data can be received column by column or read column by column from outside, wherein receiving pixel data from outside may be a passive manner of acquiring pixel data. For example, an external pixel data output component (such as a CPU or a convolution operation accelerator) outputs the pixel data in a manner of column-wise outputting, so the pixel data can be obtained in a manner of passive reception. Reading the pixel data may be an active manner of acquiring pixel data. For example, the pixel data are read from a pixel data storage component (such as a storage component or main memory of a CPU or a convolution operation accelerator, etc.) in a manner of reading by column. In particular, a reading request for column-wise reading may be sent to the pixel data storage component which provides the corresponding pixel data in a manner of column-wise outputting in response to the reading request.

Further, the component providing the pixel data outputs the pixel data in the pooling window column by column, in which case the pixel data may be received column by column; or, the pixel data may also be read actively from the component providing the pixel data column by column.

It may be understood that the manner of reading the pixel data may be on the basis of the application requirement in practice, for example, the size of the pooling window may be customized in a self-defining manner, and the specific implementation is not limited in the present invention.

In the embodiment of the present invention, pixel data may be received or read from outside column by column, thereby realizing the diversity of pixel data acquisition, thus further improving the pooling efficiency.

In another particular embodiment of the present invention, the size of the pooling window is N×N, N is a positive integer, and the moving stride of the pooling window is less than N, step S101 shown in FIG. 1 may comprise the following steps: reading the pixel data of each column in the pooling window from the outside column by column.

In the embodiment, the moving stride of the pooling window is less than N, there is overlap between adjacent pooling windows, the pixel data in overlapping portion need to be acquired twice. In this circumstance, since the component providing the pixel data outputs the pixel data of each column only once, passively receiving the pixel data may not be able to complete the pooling operation for all the pixel data.

Figure 3:
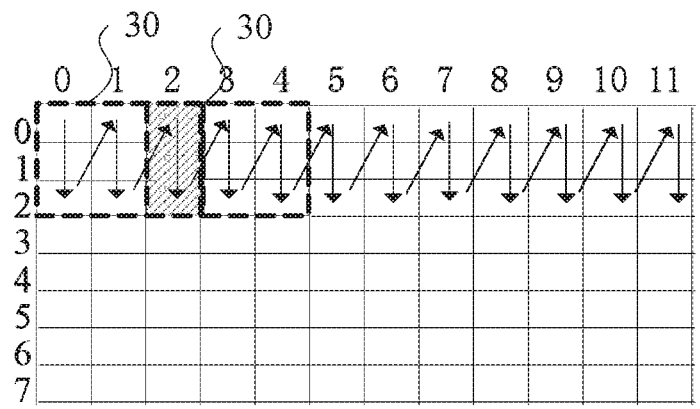
FIG. 3 is a schematic diagram of the other specific application scenario of the pooling method according to an embodiment of the present invention.

Referring to FIG. 3, the size of the pooling window 30 is 3×3 and the image size to be pooled is 12×8; when the pooling window 30 is in the position of row 0, row 1, and row 2, column 0, column 1, and column 2, the data acquired column by column are sequentially as follows: pixel data (0,0), pixel data (1,0), pixel data (2,0); pixel data (0,1), pixel data (1,1), pixel data (2,1); pixel data (0,2), pixel data (1,2), and pixel data (2,2), wherein the pixel data (1,0) represents the pixel data with a row number of 1 and a column number of 0. The order of reading pixel data is shown by the arrow in FIG. 3.

Similarly, after the pooling window 30 is moved by two pixel data laterally, when the pooling window 30 is in the position of row 0, row 1, row 2, column 2, column 3, and column 4, the data acquired column by column are sequentially as follows: pixel data (0,2), pixel data (1,2), pixel data (2,2); pixel data (0,3), pixel data (1,3), pixel data (2,3); and pixel data (0,4), pixel data (1,4), pixel data (2,4). Pixel data (0,2), pixel data (1,2), pixel data (2,2) are pixel data read repeatedly.

Other situations are similar to the above process and will not be repeated.

In the embodiment of the present invention, pixel data may be read from outside column by column to realize a repeated acquisition of pixel data; thereby, on the basis of improving the pooling efficiency, and taking into account the diversity of the pooling window, the scope of application of the pooling method is expanded.

In a preferred embodiment of the present invention, the pixel data is a convolution operation result obtained after a convolution operation.

It may be understood that the pixel data may also be other suitable pixel data, such as data without convolution operation being performed on the data.

The embodiment of the present invention may perform pooling on the result of convolution operation, which may reduce the amount of the features in the result of convolution operation for operations such as classification, recognition and so on.

Figure 4:
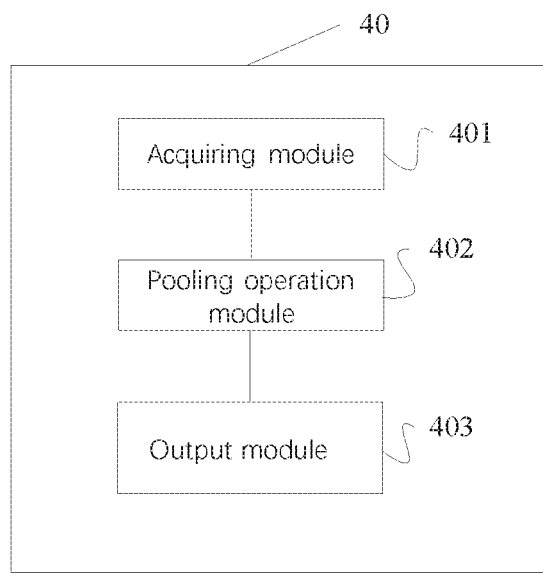
FIG. 4 is a structure schematic diagram of a pooling device according to an embodiment of the present invention.

Referring to FIG. 4, the pooling device 40 may include an acquiring module 401, a pooling operation module 402, and an output module 403.

The acquiring module 401 herein is adapted to acquire the pixel data of each column in the pooling window column by column, each time after the pooling window is moved;

The pooling operation module 402 performs the pooling operation on all of the pooling data in the pooling window when the pixel data of last column in the pooling window is acquired;

The output module 403 outputs a pooling result of the pooling operation.

In an embodiment of the present invention, the pixel data in the pooling window will be acquired column by column after the window is moved, when the pixel data need to be acquired; avoided is the shortage in the prior art that the pixel data in the pooling window cannot be obtained until a period of time has lapsed when reading the pixel data row by row. Consequently, all the pixel data in the pooling window may be acquired more quickly, and the pooling operation can be performed more quickly, thereby improving the pooling efficiency. In addition, the acquired data are completely pixel data in the pooling window with no additional pixel data outside the pooling window, therefore no memory or cache is required to temporarily store the pixel data, which is beneficial to the hardware implementation of the pooling device 40.

In one particular embodiment of the present invention, the size of the pooling window is N×N, N is a positive integer, and the moving stride of the pooling window is equal to N. The acquiring module 401 may comprise a pixel data receiving unit (not shown in the figures), which is adapted to receive the pixel data of each column in the pooling window from outside, with the pixel data of each column being sent out column by column; a first pixel data reading unit (not shown in the figures), which is adapted to read the pixel data of each column in the pooling window from the outside column by column.

In one particular embodiment of the present invention, the size of the pooling window is N×N, N is a positive integer, and the moving stride of the pooling window is less than N; and the acquiring module 401 may comprise a second pixel data reading unit (not shown in the figures), which is adapted to read the pixel data of each column in the pooling window from the outside column by column.

Figure 2:
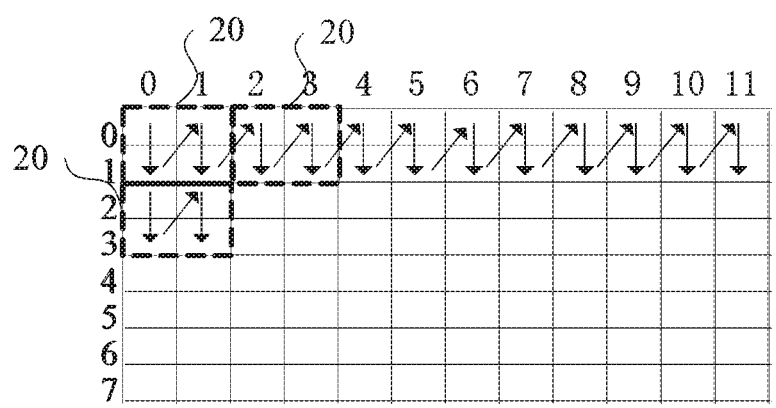
FIG. 2 is a schematic diagram of one specific application scenario of the pooling method according to an embodiment of the present invention.

For more details on the working principle and working mode of the pooling device 40, reference may be made to the related descriptions in FIG. 1 to FIG. 3, and details are not repeated herein.

Figure 5:
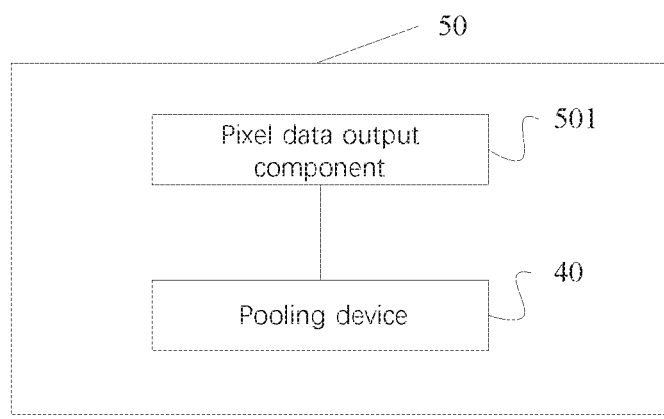
FIG. 5 is a structure schematic diagram of a pooling system according to an embodiment of the present invention.

Referring to FIG. 5, the pooling system 50 may comprise the pooling device 40 shown in FIG. 4 and a pixel data output component 501.

The pixel data output component 501 herein is adapted to provide the pixel data.

In a specific embodiment of the present invention, the pixel data output component 501 outputs pixel data of each row where the pooling window is located column by column.

In another embodiment of the present invention, the pixel data output component 501 outputs the pixel data of each column in the pooling window column by column in response to the reading request of the pooling device 40.

In this embodiment, the pooling system 50 may perform a complete pooling operation. The pooling system 50 may acquire all the pixel data in the pooling window more quickly and perform the pooling operation more quickly, thereby saving the effective time of the CPU, so that the CPU may perform more other tasks and improve the overall performance of the system.

It may be understood that the pooling system 50 may be built into any implementable terminal device, such as a computer, a tablet, a smart phone, and the like.

Further, the pixel data output component 501 may be a convolution operation accelerator or a central processor.

The convolution operation accelerator may perform a convolution operation on the image data, and the convolution operation result may be outputted to the pooling device 40 for performing the pooling operation.

The pooling device 40 may also acquire the pixel data from a central processor. More specifically, the pixel data of the central processing unit may be acquired from a convolutional operation accelerator, or may be acquired from any other implementable device, which is not limited by the embodiment of the present invention. The convolution operation accelerator herein may be a circuit or device dedicated to performing convolution operations quickly.

The embodiment of the invention further discloses a computer readable storage medium having computer instructions stored thereon, the computer instructions when executed, may perform the steps of the pooling method shown in FIG. 1. The computer readable storage medium may include a ROM, a RAM, a magnetic disk, or an optical disk. The storage medium may also include a non-volatile memory, non-transitory memory or the like.

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

What is claimed is:

1. A pooling method, comprising:

acquiring pixel data of each column in a pooling window column by column by one of a passive reception or an active read of the pixel data from an external pixel data output component, each time after the pooling window is moved, wherein the pooling window has a size of N×N, N is a positive integer, a moving stride of the pooling window equals to N, and no overlap is between adjacent pooling windows and each pixel data is acquired once;

performing a pooling operation on all of the pooling data in the pooling window when the last column of pixel data in the pooling window is acquired; and outputting a pooling result of the pooling operation.

2. The pooling method of claim 1, wherein the external pixel data output component outputs the pixel data in a column-wise outputting manner.

3. The pooling method of claim 1, wherein the pixel data is a convolution operation result obtained after a convolution operation.

4. A pooling system, comprising:

a pooling device, comprising:

an acquiring module, to acquire pixel data of each column in a pooling window column by column by one of a passive reception or an active read of the pixel data from an external pixel data output component, each time after the pooling window is moved, wherein the pooling window has a size of N×N, N is a positive integer, and a moving stride of the pooling window equals to N, and no overlap is between adjacent pooling windows and each pixel data is acquired once;

a pooling operation module, to perform a pooling operation on all of the pooling data in the pooling window when the last column of pixel data in the pooling window is acquired; and an output module, to outputting a pooling result of the pooling operation.

5. The pooling method of claim 1, wherein the external pixel data output component includes a convolution operation accelerator or a central processor.

6. The pooling system of claim 4, wherein the external pixel data output component outputs the pixel data of each row where the pooling window is located column by column.

7. The pooling system of claim 4, wherein the acquiring module comprises:

a pixel data receiving unit, configured to passively receive the pixel data of each column in the pooling window from the external pixel data output component.

8. The pooling system of claim 4, wherein the pixel data is a convolution operation result obtained after a convolution operation.

9. The pooling system of claim 4, wherein the external pixel data output component is a convolution operation accelerator or a central processor.

10. A non-transitory computer readable storage medium having computer instructions stored thereon, wherein when the computer instructions being executed, a processor is configured to perform a pooling method, the pooling method comprising:

acquiring pixel data of each column in a pooling window column by column by one of a passive reception or an active read of the pixel data from an external pixel data output component, each time after the pooling window is moved, wherein the pooling window has a size of N×N, N is a positive integer, a moving stride of the pooling window equals to N, and no overlap is between adjacent pooling windows and each pixel data is acquired once;

performing a pooling operation on all of the pooling data in the pooling window when the last column of pixel data in the pooling window is acquired; and outputting a pooling result of the pooling operation.

11. The storage medium of claim 10, wherein the external pixel data output component outputs the pixel data in a column-wise outputting manner.

12. The storage medium of claim 10, wherein the pixel data is a convolution operation result obtained after a convolution operation.

13. The storage medium of claim 10, wherein the external pixel data output component includes a convolution operation accelerator or a central processor.

* * * * *